United States Patent
Leopold et al.

(10) Patent No.: US 6,185,408 B1
(45) Date of Patent: *Feb. 6, 2001

(54) METHOD AND APPARATUS FOR MITIGATING THE EFFECTS OF A COMMUNICATIONS CHANNEL USING POLARIZED SIGNALS

(75) Inventors: Raymond Joseph Leopold, Tempe; Rodrigo Ibanez-Meier, Chandler; Randy Lee Turcotte, Tempe, all of AZ (US)

(73) Assignee: Motorola, Inc., Schaumburg, IL (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/927,149

(22) Filed: Sep. 3, 1997

(51) Int. Cl.$^7$ ................................ H04B 7/185
(52) U.S. Cl. .................. 455/12.1; 455/63; 375/346
(58) Field of Search .................. 455/12.1, 427, 455/303, 312, 10, 295, 60, 296, 67.3, 63, 70; 342/361, 365, 362; 370/500, 491; 375/346, 349

(56) References Cited

U.S. PATENT DOCUMENTS

| | | | |
|---|---|---|---|
| 3,986,123 | * 10/1976 | Tirro et al. | 455/60 |
| 4,090,137 | * 5/1978 | Soma et al. | 455/60 |
| 4,283,795 | * 8/1981 | Steinberger | 455/283 |
| 4,292,685 | * 9/1981 | Lee | 342/358 |
| 4,438,530 | * 3/1984 | Steinberger | 455/278.1 |
| 4,577,330 | * 3/1986 | Kavehrad | 375/235 |
| 5,838,740 | * 11/1998 | Kallman et al. | 375/346 |

* cited by examiner

Primary Examiner—Edward F. Urban
Assistant Examiner—Conguan Tran
(74) Attorney, Agent, or Firm—Dana B. Lemoine; Gregory J. Gorrie; Frank J. Bogacz

(57) ABSTRACT

A method and apparatus for rapidly characterizing a communications channel is used to mitigate the effects of the communications channel as present in a received signal. A satellite (20) transmits a data signal (40) and a pilot signal (50). The data signal (40) and the pilot signal (50) are substantially orthogonally polarized. A user terminal (30) receives the orthogonally polarized data signal (40) and pilot signal (50). The user terminal includes a channel information recovery circuit (250) and a channel effects mitigation circuit (240). The channel information recovery circuit (250) characterizes the communications channel by analyzing the pilot signal (50), and then provides the channel information (260) to the channel effects mitigation circuit (240) which then mitigates the effects of the channel.

12 Claims, 3 Drawing Sheets

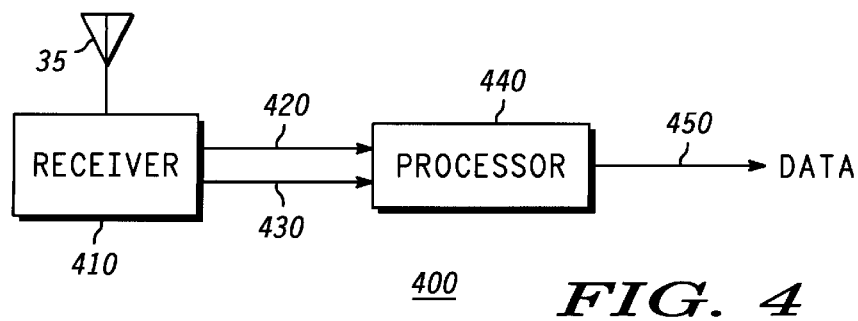
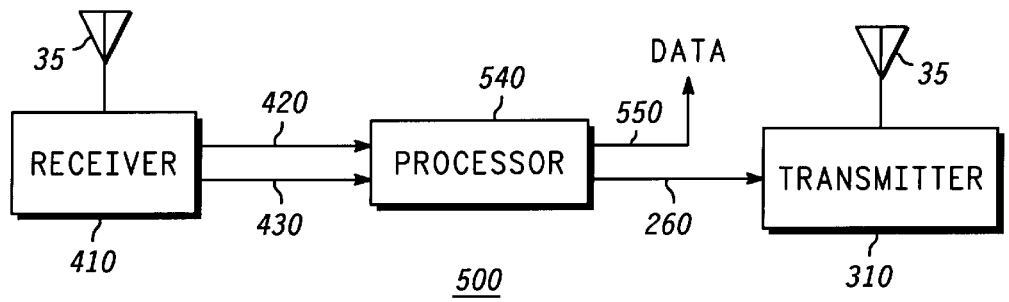
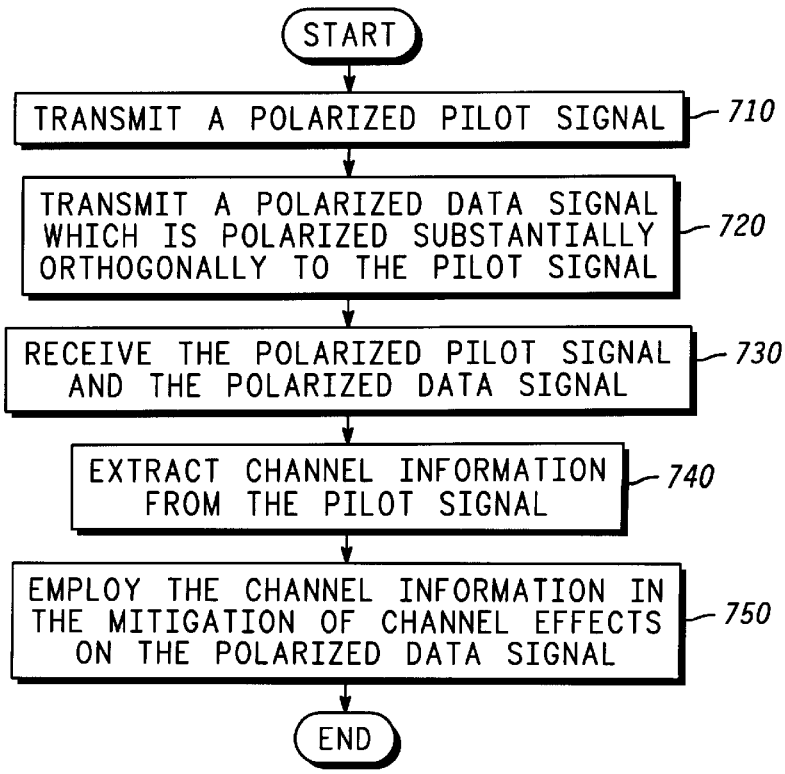

20

METHOD AND APPARATUS FOR MITIGATING THE EFFECTS OF A COMMUNICATIONS CHANNEL USING POLARIZED SIGNALS

FIELD OF THE INVENTION

This invention relates in general to the mitigation of communications channel effects present in received signals and, in particular, to the use of multiple polarized signals in the mitigation of communications channel effects present in received signals.

BACKGROUND OF THE INVENTION

In satellite communications systems, it is necessary to transmit signals from satellites orbiting the earth to the surface of the earth and vice versa. These signals travel through the atmosphere of the earth including the ionosphere and the troposphere. Because the characteristics of the different atmospheric layers change over time, and other changes in the transmission medium such as shadowing trees, signals traveling between the satellite and terminals are subjected to varying amounts of fading, blockage and distortion.

Low earth orbit (LEO) satellites are particularly vulnerable to the rapid physical changes in the path through which signals are transmitted. LEO satellites move, sometimes quite rapidly, relative to the earth's surface causing the conditions (e.g. atmospheric) present in the communication path between a user on the earth and the satellite to also change rapidly. These rapid changes in the communications channel commonly result in signal distortion and fading.

To maintain a robust link between users on the earth's surface and orbiting LEO satellites, the effect of fading and distortion as a result of changes in the communications channel are desirably mitigated. One known method of mitigating the effects of fading in a communications channel is to operate at an increased power level.

Historically, when designing a satellite communications system, a link budget is created which includes allowances for signal fading as a result of atmospheric changes. A power level is then set such that, if any fading should occur, sufficient power remains to overcome the effect. Although this results in a robust link, excess power is used when there is little or no fading in the channel. The use of excess power when unnecessary is very undesirable, and could be avoided if the effects of the communications channel could be mitigated without a constant increase in power level.

What is needed is an apparatus and method for rapidly characterizing a communications channel and mitigating the effects that the communications channel has on a signal, while allowing for uninterrupted transmission of user data.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 4 shows a diagram of a user terminal in accordance with an alternate embodiment of the present invention;

FIG. 5 shows a diagram of a user terminal in accordance with an alternate embodiment of the present invention;

FIG. 7 shows a flowchart for a method of mitigating the effects of a communications channel in accordance with a preferred embodiment of the present invention.

DETAILED DESCRIPTION OF THE DRAWINGS

Figure 1:
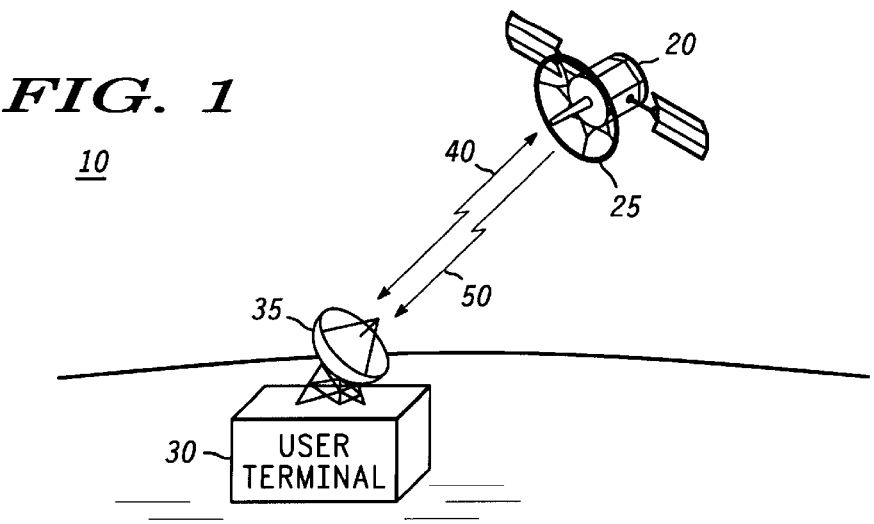
FIG. 1 shows a satellite communications system in accordance with a preferred embodiment of the present invention.

Turning now to the drawings in which like reference characters indicate corresponding elements throughout the several views, attention is first directed to FIG. 1. FIG. 1 shows a satellite communications system in accordance with a preferred embodiment of the present invention. Satellite communications system 10 includes user terminal 30, antenna 35, satellite 20, and antenna 25. Also shown in FIG. 1 are data signal 40 and pilot signal 50. Satellite 20 can be a satellite in any orbit including a geosynchronous (GEO) orbit, or a medium earth orbit (MEO), or a LEO orbit. Satellite 20 communicates with user terminal 30 by transmitting data signal 40. User terminal 30 is an earth based terminal which may be fixed, but is preferably transportable.

As previously discussed, data signals traveling through the communications channel experience varying amounts of fading and distortion, due, for example, to the earth's atmosphere. To help mitigate fading and distortion, satellite 20 transmits pilot signal 50 in substantially the same communications channel as data signal 40. Data signal 40 and pilot signal 50 are polarized in a substantially orthogonal manner so that they may be received separately with little or no cross-polarization between the two.

Linear polarization of signals in free space is a known method for allowing multiple separate communications using the same frequency carrier. For example, a first signal may be vertically polarized using a carrier, and a second signal may be horizontally polarized using a carrier of the same frequency. As long as the two signals have complete orthogonality in their polarizations, they can be completely separated at a receiver. Multiple methods of polarization are contemplated including circular polarization and linear polarization.

Data signal 40 comprises information in the form of data to be transmitted from satellite 20 to user terminal 30 and back. Data in data signal 40 which is received at user terminal 30 is not generally known to user terminal 30 prior to reception. Pilot signal 50, on the other hand, is a signal known to user terminal 30 prior to reception. Further, pilot signal 50 and data signal 40 desirably share attributes such as frequency.

User terminal 30 receives both data signal 40 and pilot signal 50 with antenna 35. Antenna 35 is an antenna capable of receiving multiple polarized signals for processing by a receiver. Antenna 35 may be multiple physical antennas, such as two linearly polarized antennas or two circularly polarized antennas, but in a preferred embodiment as exemplified in FIG. 1, antenna 35 is a single antenna such as a phased array antenna.

In operation, pilot signal 50 is subjected to the same channel effects as data signal 40. Because pilot signal 50 and data signal 40 can share attributes such as frequency, the channel effects, including fading and distortion, affect pilot signal 50 and data signal 40 in substantially the same manner. Because pilot signal 50 is known to user terminal 30, user terminal 30 can effectively measure the characteristics of the communications channel existing between satellite 20 and user terminal 30. With knowledge of the channel characteristics, data signal 40 can be corrected at user terminal 30 to help mitigate the effects of the communications channel as present in the received data signal. This correction can be done through conventional equalization methods, such as transverse filters with time delayed taps, or any other method that "corrects" the desired signal and minimizes the mean square distortion or any similar error measure (e.g. peak distortion) of the input data signal. Alternatively or in conjunction, other signal processing methods that could utilize the pilot signal information to minimize downstream performance error measures such as symbol or bit error rates can be employed.

Alternatively, user terminal 30 can transmit channel information extracted from pilot signal 50 back to satellite 20 using data signal 40. Satellite 20 can then modify or otherwise predistort data signal 40 prior to transmission to overcome the effects of the communications channel as measured by pilot signal 50.

The satellite communications system as shown in FIG. 1 is capable of mitigating the channel effects in near real time. As the channel characteristics change, pilot signal 50 reflects the changes, and the channel information provided by pilot signal 50 can be used for better reception of data signal 40. By mitigating channel effects in near real time, a robust link can be maintained at lower power levels than would otherwise be necessary. The resulting power savings is advantageous because the satellite and the user terminal can then operate longer from a signal power source.

Because both data signal 40 and pilot signal 50 travel from the satellite through the ionosphere and to the ground, they generally experience the same Faraday rotation, or more simply stated, the same change in polarization. The inclusion of pilot signal 50, which is known to user terminal 30, allows data signal 40 to have a polarization value which is measured relative to the polarization value of pilot signal 50. Polarization relative to a reference polarization allows the system to operate regardless of the Faraday rotation caused by the ionosphere.

The apparatus and methods of the present invention can be advantageously used in a variety of frequency bands, but because the effects of Faraday rotation become less pronounced at higher frequencies, the present invention preferably operates at Ka band or above.

Of course, the use of polarized data and pilot signals is not limited to satellite communication systems, but is widely applicable to a variety of possible communication systems. The method and apparatus of the present invention is therefore not limited to satellite communications. One of the many other possible uses is in the area of terrestrial communications networks, and especially networks which have unobstructed line-of-sight (LOS) communications between transmitters and receivers, or those networks which are otherwise generally less affected by multipath reflections. Terrestrial communications networks could benefit greatly from the improved quality of communications, power control, and power savings as provided by the present invention.

Figure 2:
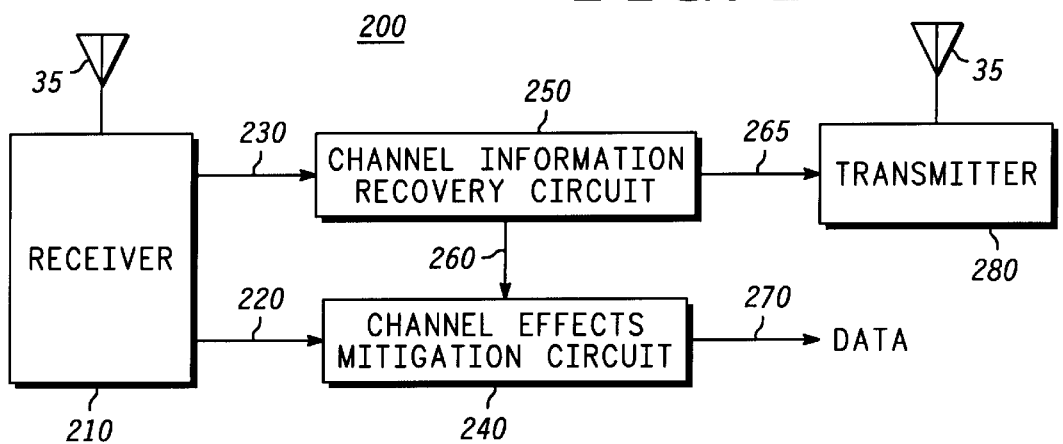
FIG. 2 shows a diagram of a user terminal in accordance with a preferred embodiment of the present invention.

FIG. 2 shows a diagram of a user terminal in accordance with a preferred embodiment of the present invention. User terminal 200 includes antenna 35, receiver 210, channel information recovery circuit 250, channel effects mitigation circuit 240, and transmitter 280. Receiver 210 receives signals from antenna 35. In particular, receiver 210 receives data signal 40 (FIG. 1) and pilot signal 50 (FIG. 1). Receiver 210 receives these signals that are substantially orthogonal polarized and produces signals 220 and 230 which are internal to user terminal 200. Signal 230 corresponds to the received pilot signal. Channel information recovery circuit 250 receives signal 230 from receiver 210, and recovers information regarding the channel. Because user terminal 200 has knowledge of pilot signal 50 (FIG. 1) as transmitted by satellite 20 (FIG. 1), channel information recovery circuit 250 can readily ascertain the effects of the communications channel on data signal 40 (FIG. 1).

Channel information recovery circuit 250 is implemented using circuits and methods known in the art, such as a method to generate filter coefficients. Channel information recovery circuit 250 provides channel information 260 to channel effects mitigation circuit 240. Along with channel information 260, channel effects mitigation circuit 240 receives signal 220 from receiver 210. Signal 220 represents data signal 40 (FIG. 1) as received by receiver 210. Signal 220 includes the cumulative effects caused by the communications channel. Channel effects mitigation circuit 240 mitigates the effects of the communication channel on signal 220, and produces data signal 270.

Channel effects mitigation circuit 240 utilizes circuits and methods known in the art to mitigate the effects of the channel on the received signal. One example of a channel effects mitigation circuit is a filter with coefficients provided as channel information 260. When channel effects mitigation circuit 240 is a filter, the filter can be viewed as an inverse channel filter, or an equalizer. The mitigation can be performed through conventional equalization methods, such as transverse filters with time delayed taps, or any other method that "corrects" the desired signal and minimizes the mean square distortion or any other measure (e.g. peak distortion) of the input data signal. The apparatus and method of the present invention can advantageously continuously update the filter coefficients, with the benefit of a continuous "training sequence" provided by the pilot signal. This method provides the update rate of an adaptive equalizer, with the added benefit of being robust to greater channel error performance. In contrast, adoptive algorithms are known to "diverge" in the presence of significantly large channel errors. Alternatively or in conjunction, other signal processing methods that could utilize the pilot signal information to minimize downstream performance error measures such as symbol or bit error rates can be employed.

The portion of user terminal 200 described thus far mitigates channel effects solely through the apparatus and method of the user terminal. In addition to the user terminal, the satellite is contemplated as playing a role in mitigating the effects of the communications channel. To this end, channel information recovery circuit 250 also provides channel information 265 to transmitter 280 to be transmitted back to satellite 20 (FIG. 1) via antenna 35.

FIG. 2 shows antenna 35 receiving signals for receiver 210 and transmitting signals for transmitter 280. While the figures exemplifying a preferred embodiment of the present invention imply that a single antenna 35 is utilized, multiple antennas are also contemplated.

User terminal 200 as shown in FIG. 2 helps mitigate the effects of a communications channel in near real time. Even as the communications channel changes rapidly because of a satellite moving quickly relative to the earth, user terminal 200 mitigates the undesirable effects caused by the communications channel.

Figure 3:
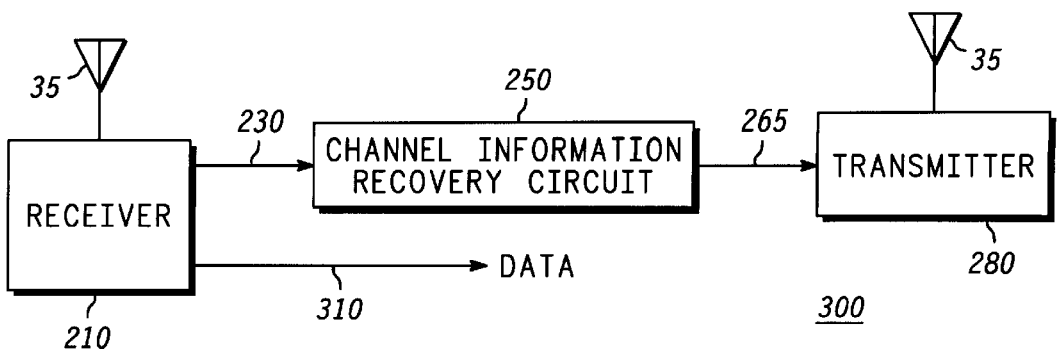
FIG. 3 shows a diagram of a user terminal in accordance with an alternate embodiment of the present invention.

FIG. 3 shows a diagram of a user terminal in accordance with an alternate embodiment of the present invention. FIG.

3 shows user terminal 300, which is much like user terminal 200 (FIG. 2), except without the channel effects mitigation circuit. In the alternate embodiment as exemplified by FIG. 3, all channel effects mitigation is accomplished in a location other than user terminal 300. Channel information recovery circuit 250 continues to receive signal 230 which is a received version of pilot signal 50 (FIG. 1), and continues to provide channel information 265 to transmitter 280. Transmitter 280 transmits channel information 265 using antenna 35. The channel information as transmitted by transmitter 280 is used to modify or otherwise predistort the data signal to be received by user terminal 300, where the modification or predistortion takes place at the source of the transmission.

Receiver 210 then receives data signal 40 (FIG. 1) which has undergone modifications at its source, and which has been subjected to the effects of the communications channel. As a result, the data signal received at receiver 210 is a modified or predistorted data signal which has been subjected to the effects of the communication channel, thereby mitigating the channel effects. Data signal 310 is then produced at the output of receiver 210.

FIG. 4 shows a diagram of a user terminal in accordance with an alternate embodiment of the present invention. User terminal 400 includes antenna 35, receiver 410, and processor 440. As in the previously described embodiments, receiver 410 receives data signal 40 and pilot signal 50 (FIG. 1) where these signals are substantially orthogonally polarized. Receiver 410 then provides signals 420 and 430 to processor 440. Signals 420 and 430 correspond to data signal 40 (FIG. 1) and pilot signal 50 (FIG. 1) respectively. Signals 420 and 430 can be analog signals, but are preferably digital signals.

Processor 440 receives signal 420, which represents the transmitted data signal, and signal 430, which represents the transmitted pilot signal. Processor 440 then mitigates the effects of the communications channel on the data stream by utilizing channel information which is extracted from signal 430. Processor 440 can be dedicated digital hardware or, more preferably, a programmable digital signal processor. Processor 440 desirably implements a filter which has a function that is the inverse of the communications channel. This inverse channel filter is commonly called an equalizer. Processor 440 produces data 450, which has had the effects of the communications channel mitigated through the use of the inverse channel filter.

FIG. 5 shows a diagram of a user terminal in accordance with an alternate embodiment of the present invention. User terminal 500 as shown in FIG. 5 includes antenna 35, receiver 410, processor 540, and transmitter 310. User terminal 500 is much like user terminal 400 (FIG. 4) except that processor 540 of user terminal 500 provides channel information 260 to transmitter 310 for transmission back to satellite 20 (FIG. 1). Processor 540 of user terminal 500 produces data signal 550 using one of a plurality of algorithms. One algorithm is that algorithm exemplified in FIG. 4 where data 550 is produced by implementing an inverse channel filter within digital signal processor 540.

An alternate algorithm simply passes signal 420 on to become data signal 550. Another aspect of this alternate algorithm provides channel information 260 via transmitter 310 to satellite 20 (FIG. 1). Satellite 20 then modifies or otherwise predistorts the data signal prior to transmission. As a result, the data signal received at receiver 410 is a modified or predistorted data signal which has been subjected to the effects of the communication channel, thereby mitigating the channel effects.

Near real time equalization of the communications channel while allowing for the continued transmission of user data is an advantage provided by the method and apparatus of the present invention. In addition to near real time equalization, data signals 420 and 430 can be saved by processor 540, for later post-processing. Signal 420 can be filtered in the post-processing step to mitigate the effects of the communications channel in non-real time.

Figure 6:
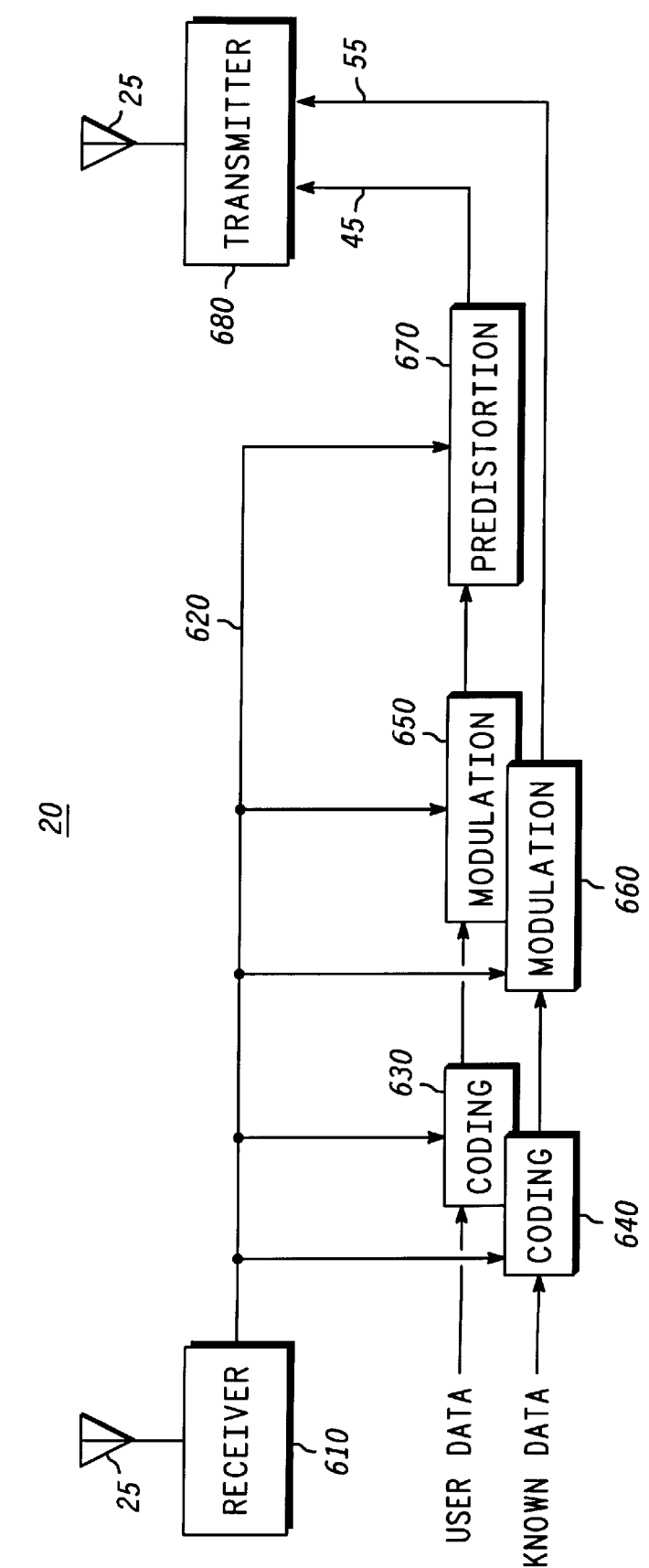
FIG. 6 shows a diagram of a satellite in accordance with a preferred embodiment of the present invention.

FIG. 6 shows a diagram of a satellite in accordance with a preferred embodiment of the present invention. Satellite 20 includes antenna 25, receiver 610, coding blocks 630 and 640, modulation blocks 650 and 660, predistortion block 670, and transmitter 680. Satellite 20 transmits two separate signals. Data signal 40 (FIG. 1) is the transmitted version of data signal 45 as shown in FIG. 6. Likewise, pilot signal 50 (FIG. 1) corresponds to pilot signal 55 as shown in FIG. 6.

Pilot signal 55 is generated internal to satellite 20 by starting with known data. The known data is known to the intended recipient, and is coded in coding block 640 and modulated in modulation block 660. The result is pilot signal 55, which will be transmitted through the communications channel and received by the intended recipient which has knowledge of the known data, the coding used, and the modulation type. Data signal 45 comprises information bearing data, and is generated when user data is coded in coding block 630, modulated in modulation block 650 and optionally predistorted in predistortion block 670.

Receiver 610 receives data signals which include channel information. The channel information received at receiver 610 can include raw channel characteristic information, such as amplitude or phase information describing the user data signal as received at a user terminal. Alternatively, and preferably, the channel information received at receiver 610 includes processed channel information transmitted by a user terminal. This processed channel information 620 includes information which controls the coding and modulation of the data signal and the pilot signal, and also includes predistortion information for the data signal.

If a user terminal receiving the polarized signals as transmitted by transmitter 680 determines that a different code or different modulation type is desirable, channel information is sent to satellite 20, and received by receiver 610, which changes the code or the modulation type. Additionally, a user terminal may command satellite 20 to predistort the data signal to help mitigate the effects of the communications channel on the transmitted data signal.

Specific embodiments have now been described for user terminals, which are ground based, and for satellites, which are space based. It will be apparent that the user terminal circuits described may reside in a satellite, and the satellite circuits described may reside in a user terminal.

FIG. 7 shows a flowchart for a method of mitigating the effects of a communications channel in accordance with a preferred embodiment of the present invention. Method 700 begins when a polarized pilot signal is transmitted in step 710. The polarized pilot signal includes coding and a modulation type that are both known to an intended recipient.

Then in step 720, a polarized data signal is transmitted, where the data signal is polarized substantially orthogonally to the pilot signal. The data signal also includes coding and a modulation type; however the coding and modulation type of the data signal are not necessarily the same as the coding and modulation type of the pilot signal. The polarized pilot signal of step 710 and the polarized data signal of step 720 can be transmitted from separate transmitters; however, they are preferably transmitted by the same transmitter.

In step 730 the polarized pilot signal and the polarized data signal are received at a receiver. The receiver has the capability to receive orthogonally polarized signals and maintain them separately while minimizing cross polarization.

The pilot signal received at the receiver includes known data, known coding, and known modulation type, so that the receiver may extract channel information from the pilot signal. This channel information is extracted from the pilot signal in step 740. The channel information is preferably in the form of filter coefficients that can be used in an inverse filter that mitigates the effects that the communications channel has had on the received data.

After channel information is extracted from the pilot signal, the channel information is employed in the mitigation of channel effects on the polarized data signal in step 750. When the channel information is in the form of filter coefficients, step 750 includes the filtering of the received data signal. After step 750, the received data has had the effects of the communications channel mitigated.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A method of dynamically reducing the effects of distortion in a communications channel between a satellite in low-Earth orbit and and a ground station wherein the satellite is moving rapidly with respect to the ground station resulting in rapid changes in said communications channel, said method comprising the steps of:

transmitting from the satellite a data signal having a first linear polarization;

transmitting from said the satellite a pilot signal having a second linear polarization orthogonal to the first polarization, said pilot signal signal having a same frequency as said data signal;

receiving at said ground station said pilot signal and said data signal through said communications channel, the pilot signal and data signal received by the ground station having channel distortion;

extracting channel distortion information from said pilot signal by comparing the received pilot signal with pilot signal information stored in the ground station; and mitigating channel effects on said data signal using said channel distortion information.

2. The method of claim 1 further comprising the steps of:

the ground station transmitting said channel distortion information to said satellite;

the satellite applying pre-distortion to said said data signal prior to transmitting said data signal, said predistortion compensating at least in part for said channel distortion imparted on said data signal by the communications channel; and repeating the steps of extracting and mitigating during the rapid movement of said satellite in low-earth orbit thereby dynamically compensating for distortion in the communications channel.

3. The method of claim 2 wherein said pilot signal comprises a predetermined data sequence known by said ground station.

4. The method of claim 3 wherein the receiving step comprises the step of receiving the pilot signal and the data signal with a phased-array antenna.

5. The method of claim 4 wherein said extracting step comprises the step of determining inverse channel filter coefficients.

6. The method of claim 5 wherein said mitigating step comprises the step of filtering said data signal using said inverse channel filter coefficients to reduce an amount of mean-square and peak distortion, said filtering step being performed with a transverse filter having time-delay taps.

7. A satellite communication system that dynamically reduces the effects distortion in a communications channel comprising:

a ground station; and a transmitter located on a rapidly moving low-earth orbiting satellite linked with said sound station by the communications channel, wherein rapid changes in said communications channel are caused by the rapid movement of the satellite resulting in distortion, wherein the ground station comprises:

a receiver for receiving a data signal having a first linear polarization and a pilot signal having a second linear polarization, said first linear polarization and said second linear polarization being substantially orthogonal, said data signal and said pilot signal being received through said communications channel from the transmitter, the data signal and the pilot signal having the same frequency;

a channel effects mitigation circuit coupled to said receiver, wherein said channel effects mitigation circuit mitigates channel effects on said data signal using channel distortion information extracted from said pilot signal;

a channel information recovery circuit coupled between said receiver and said channel effects mitigation circuit, wherein said channel information recovery circuit extracts said channel distortion information from the received pilot signal by comparing the received pilot signal with pilot signal information stored in the ground station, whereby the channel information recovery circuit extracts said channel distortion information and the chanel effects mitigation circuit mitigates said channel effect as the satellite moves rapidly with respect to the ground station thereby dynamically compensating for distortion in the communications channel.

8. The satellite communication system of claim 7 wherein the channel distortion information comprises inverse channel filter coefficients and said channel effects mitigation circuit comprises a transverse filter having time-delay taps for reducing an amount of mean-square and peak distortion present in the received data signal.

9. The satellite communication system of claim 8 wherein the ground station further comprises a ground station transmitter for transmitting the channel distortion information to the satellite and the satellite applies pre-distortion to said said data signal prior to transmitting said data signal, said predistortion being based on the channel distortion information, whereby said predistortion compenstates in part for said channel distortion imparted on said data signal by the communications channel.

10. The satellite communication system of claim 9 wherein said said pilot signal comprises a predetermined data sequence known by the channel information recovery circuit.

11. The satellite communication system of claim 10 wherein said ground station further comprises a phased-array antenna for receiving the data signal and the pilot signal from the satellite.

12. The satellite communication system of claim 11 wherein said channel information recovery circuit comprises a digital processor.

* * * * *

UNITED STATES PATENT AND TRADEMARK OFFICE
CERTIFICATE OF CORRECTION

PATENT NO.    : 6,185,408 B1
DATED         : February 6, 2001
INVENTOR(S)   : Raymond Joseph Leopold et al.

It is certified that error appears in the above-identified patent and that said Letters Patent is hereby corrected as shown below:

<u>Column 8,</u>
Line 8, delete "sound" and add -- ground --.

Signed and Sealed this

Twenty-third Day of April, 2002

Attest:

JAMES E. ROGAN
*Attesting Officer*    *Director of the United States Patent and Trademark Office*